United States Patent [19]

Lee et al.

[11] Patent Number: 5,177,732
[45] Date of Patent: Jan. 5, 1993

[54] OPTICAL RECORDING USING AN AGGLOMERATING RECORDING MEDIUM WHICH CHANGES REFLECTIVITY UPON RECORDING

[75] Inventors: Neville Lee, Thousand Oaks; Edward V. LaBudde, Newbury Park; Shiuh Chao, Hawthorne, all of Calif.; Robert A. LaBudde, Virginia Beach, Va.

[73] Assignee: Unisys Corporation, Detroit, Mich.

[21] Appl. No.: 794,015

[22] Filed: Nov. 1, 1985

Related U.S. Application Data

[62] Division of Ser. No. 319,407, Nov. 9, 1981, abandoned.

[51] Int. Cl.⁵ ............................ G11B 7/00; G11B 7/24
[52] U.S. Cl. ..................................... 369/100; 369/284; 369/275.5
[58] Field of Search ................ 369/100, 275, 109-112, 369/120-123, 283-288; 365/106, 120, 124, 127, 215, 109-113; 346/76 L, 135.1, 1.1, 108, 137; 430/64, 65, 348, 495, 496, 502, 945, 961; 428/64, 65, 132, 913; 427/166, 250, 304, 357, 358, 162; 250/317.1

[56] References Cited

U.S. PATENT DOCUMENTS

| | | | |
|---|---|---|---|
| 3,665,483 | 5/1972 | Becker et al. | 346/76 L |
| 4,082,549 | 4/1978 | Haas et al. | 250/317 |
| 4,285,056 | 8/1981 | Bell | 369/100 |
| 4,335,198 | 6/1982 | Hanada et al. | 346/76 L |
| 4,394,661 | 7/1983 | Peeters | 346/76 L |
| 4,451,915 | 5/1984 | LaBudde et al. | 369/109 |

OTHER PUBLICATIONS

Journal of Applied Physics, vol. 37, No. 7, "Optical Properties of Thin Metallic Films in Island Form", Doremus, Jun. 1966, pp. 2775-2781.

Physical Review B, vol. 18, No. 2, "Optical Properties of Discontinuous Gold Films", Norrman et al., Jul. 15, 1978, pp. 674-695.

Optical Engineering, vol. 20, No. 3, "Media for High-Density Optical Recording", Bartolini, May/Jun. 1981, pp. 382-386.

Image Technology, "Continuous Wave Laser Recording on Metallic Thin Film", Harris et al., Apr./May 1970, pp. 31-35.

Wescon Technical Papers, vol. 12, "Some Considerations in the Design of a Laser Thermal Microimage Recorder", Carlson et al., 1968, pp. 1-8.

Primary Examiner—Aristotelis Psitos
Assistant Examiner—Steven R. Garland
Attorney, Agent, or Firm—John J. McCormack; Mark T. Starr

[57] ABSTRACT

Recording methods, systems and media for recording and read-out with relatively low-power laser means to write digital data "bits" (as reflectance changes) for high density computer storage. One preferred medium comprises a disk support having an "anti-reflective" surface on which is laid a non-continuous "information layer" adapted to absorb recording radiation (from laser beam), and so "write" the bits, by "agglomerating" (coalescing).

The information layer exhibits suprisingly high sensitivity, apt for low power recording, and extended archival stability; more suprising, it appears to be formed without any evidence of the usual ablation, "pit formation" or other deformation.

34 Claims, 4 Drawing Sheets

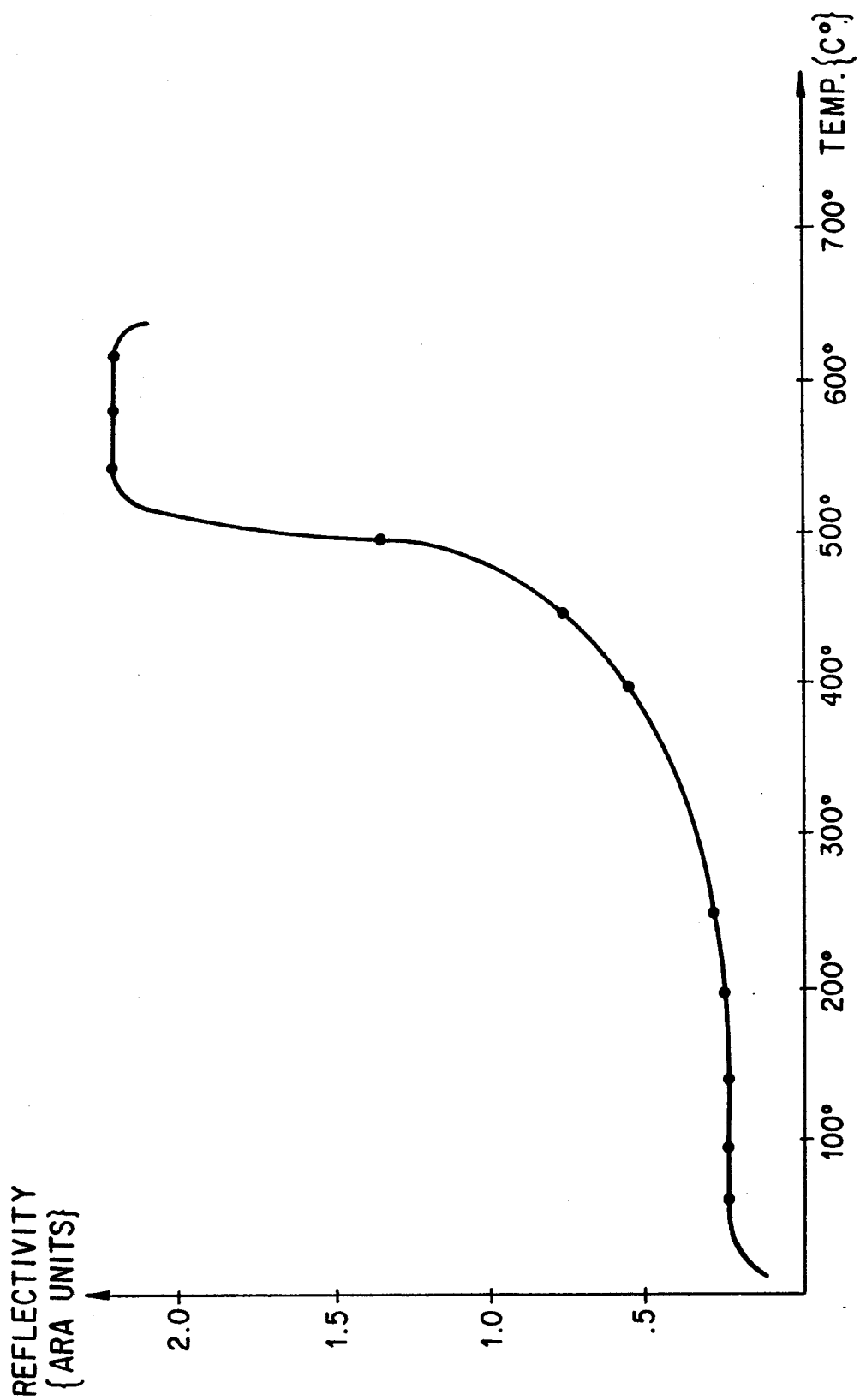

OPTICAL RECORDING USING AN AGGLOMERATING RECORDING MEDIUM WHICH CHANGES REFLECTIVITY UPON RECORDING

This is a division of application Ser. No. 07/319,407, filed Nov. 9, 1981, now abandoned.

CROSS REFERENCE TO RELATED PATENT APPLICATIONS

This patent application contains subject matter relating to our commonly-assigned concurrently-filed copending patent applications Ser. No. 06/319,406, Ser. No. 06/319,463, each filed on Nov. 9, 1981.

The present invention relates to a novel high density archival information storage medium, and more particularly to such a medium adapted for recording with low-power laser means.

INTRODUCTION, BACKGROUND

Optical storage of digital data is a relatively new technology, concerned with the storage and retrieval of digital information using optical techniques, using a special related (ODD, "optical digital data") medium, such as an ODD disk. By analogy such data is conventionally stored on magnetic media like tapes or disks commonly used with high speed digital computers today.

This disclosure relates to analogous optical media and associated read/write techniques and apparatus which are adapted to record and read-back the digital information using a focused beam of prescribed radiation energy, especially with low power laser equipment.

As workers well know, success in designing and operating such a system depends greatly on the storage medium. Workers in the art have, for some time now, pondered how to develop a satisfactory ODD disk medium, especially one adapted for low power lasers presently available and most practical. This invention teaches a practical ODD disk for this purpose, one adapted for reasonably long stable archival-life (e.g., on the order of 10 or more years) and use for record storage in high speed computer systems of today.

Laser recording media, generally:

Now, requirements for such ODD media are stringent; e.g., involving high bit density and cost-effective information storage at satisfactory write/read rates; especially using low-powered lasers. (Workers recognize the simplicity and power of such laser implementation, where one need only modulate and deflect a laser beam for read/write operations). In related applications (e.g., video disk recording) workers have used lasers and, for certain aspects thereof, have suggested media using a metal film as an "information layer", this layer being softened, melted or vaporized (e.g., thermally-ablated) by a write-laser beam sufficient to form a "void" (a pit, hole, bubble, etc., or other deformation) in the layer as the "bit". Such a film may be coated on the surface of a rotating disk.

Many workers have felt that such laser recording is promising for computer records of various kinds; e.g., the mentioned ODD media. They have predicted that practical systems await media responsive to low-power laser writing and that this in turn depends whether one can find such an information layer (material) able to be melted (or vaporized, etc.) at current practical low-power levels. This may also depend on the radiation efficiency of the associated system and on the thermal regime surrounding the layer (e.g., see Bartoline article cited elsewhere).

Thus, workers have looked for such laser recording materials which exhibit high thermal efficiency (a measure of how much of the heat generated at the recording site remains sufficiently localized to allow "pit" formation), and have long sought-out recording materials with a low melting point and low thermal diffusivity (tellurium, lead, bismuth and indium are examples).

And, since workers prefer to use low-power lasers for such recording (e.g., to enhance the operating life of a laser and minimize its cost and size), it has seemed even more desirable that the metal chosen for such an information (absorber) film have an "outstandingly-low" melting point ("adequately-high sensitivity") so that the desired "void" may be formed with minimal laser power.

Te Absorber films:

Now, some workers have contemplated using Tellurium (Te) absorber films for this, or related, laser-recording for several reasons. Tellurium has an attractively-low melting point (about 450° C.), conducts heat poorly and appears able to provide good sensitivity and S/N ratio; also, it is relatively convenient to deposit as a thin film. Bismuth is also commonly suggested for like reasons. And related alloys (e.g., as Te-Ge, Te-As-Se and Bi-Se) have been suggested as of interest.

Tellurium has a low write-threshold (energy)—when compared with Aluminum, for instance, as well as having a much lower thermal diffusivity—e.g., see U.S. Pat. No. 4,222,071 to Bell, et al; also see "Review of Optical Storage Medial" by Zech, SPIE Vol. 177, Optical Information Storage, 1979, page 56 et sequ.; and also see "Optical Recording Media Review" by Bartoline, page 2 et sequ. of SPIE Vol. 123, "Optical Storage Materials and Methods", 1977).

For instance, this Bartoline article discusses such absorber films ("Ablative Thin Films") along with ten other optical recording means—including "Photopolymers", that is organic compounds known to undergo photochemical changes which involve a shift in refractive index. The Zech article discusses absorber films arranged and used so that laser-writing forms a "hole" in the absorbing layer, this information being detected according to difference in reflectivity (similarly for Bell patent).

For such known "deformational recording", it appears that the thermal energy delivered by a high intensity radiation beam ("Write-Beam" of a Laser) is such that the "write-site" will soften, melt or ablate, in at least part of the beam cross-section. It is believed that surface tension then causes a "transverse cavitation" (see article by Zech cited above), leading in turn to the formation of a "pit" or hole, usually slightly elliptical. (See "Melting Holes in Metal Films for Real-Time, High Density Data Storage" by Cochran and Ferrier, SPIE Proceedings, August 1977, pages 17-31).

Absorber films:

As one feature hereof, we have discovered a related kind of laser-recording can be done at temperatures well-below the melting point of such an "absorber". And, as a result we have also discovered that materials like gold, having a relatively high melting point and rather good conductivity—characteristics heretofore shunned by workers for the instant purposes—can yield a surprisingly good absorber film; one comparable in sensitivity to a "hitherto-preferred" absorber like Tellurium.

Of course, some have vaguely speculated that "high melting point" materials like Titanium and Gold (also platinum, rhodium, nickel, chromium, manganese and vanadium—e.g., cf. U.S. Pat. No. 4,285,056 to Bell) might be suitable for such "deformation" absorber layers. However, such speculations have paid no heed to the practical problem of "sensitivity" or to how a lower power laser can record on them as mentioned above. Or they have ignored the associated problem of high conductivity (where heat is readily conducted away from the recording site it is wasted, further degrading sensitivity—note a metal like gold has a high conductivity, whereas Ti and Te do not).

More astute observers have acknowledged that such "high-melting-point" metals are quite unlikely as absorber candidates (e.g., as expressed in cited U.S. Pat. No. 4,222,071 where the "low-melting-point" and poor conductivity of Te was heartily endorsed as yielding superior sensitivity and enabling one to record with a low-power laser. Thus, metals such as Au which are the REVERSE; i.e., good heat conductors and high melting point should, in theory, be the worst "absorbers"). Yet, the present invention teaches that just such metals as gold can be used and be superior to known absorbers—e.g., having a sensitivity somewhat equivalent to Te and much superior archival life.

This invention, further, teaches that such absorber films—contrary to everything taught in the art—evidently need form no holes or be otherwise deformed in the course of recording.

Extended archival life:

A major advantage of optical data storage technology is the increased storage capacity it affords; e.g., the order of 100× that of magnetic tape. An optical data disk as here contemplated will be assumed as "non-erasable", with information stored permanently thereon for an extended archival life on the order of 10-15 years or more. Such extended life is a goal yet to be reached in the art, though workers would dearly love to do so. The present invention promises media exhibiting this archival life, being especially adapted for optical mass memory and like applications.

By contrast, commonly-suggested absorber metals like Bismuth and Tellurium are known to slowly oxidize and otherwise degrade much too readily in the typical user environment; hence, they are poor candidates for such archival records (e.g., see cited article by Ash et al. 1981; and Zech article; also demonstrated by Example I below). Workers generally realize that Tellurium has particularly poor archival stability—i.e., its read-out quickly degrades with time. This degradation is accelerated in a high humidity environment; and is typically characterized by a rapid increase in overall optical transmission, presumably caused by a general oxidation of the metal, as well as by severe attack on selected bit sites, beginning at "defect sites" in the metal film. And Bismuth is similar.

This archival feature is addressed by this invention which teaches the analogous use of related films of gold, etc.—materials which are quite archival and are stable for extended use as computer information storage media, especially as for such optical data disk records for (as in Table I) computers.

Thus, as a feature of novel application, we contemplate the use of such materials for records exhibiting the desired archival life, i.e., being extremely resistant to oxidation or like environmental degradation, during the contemplated use. Thus, no "loss" of recorded information will occur over extended (storage) life—i.e., reflectivity remains stable enough to "read". No practical storage medium or associated system is yet available which can provide extended archival life; especially where high sensitivity is also required (e.g., the sensitivity of Te or better). The invention teaches just this step forward.

The novel recording media taught herein will be generally assumed as meeting the foregoing criteria; and, where possible, as also meeting one or more of the "Target performance criterial" presented in Table I below. (See also "Optical Properties of Tellurium Films Used for Data Recording" by Ash and Allen, SPIE, Vol. 222, 1980).

TABLE I (Target Media Criteria)

1. "High" Sensitivity:
   allow recording with low-power laser means. "Sensitivity" will be understood as minimum laser power needed for bit formation (change in spot reflectivity, akin to that resulting from formation of a hole, or other void or like change in medium, giving adequate read-out at contemplated recording rate). With the invention, one may typically "write" with the order of 5-15 mW laser power for approximately 40-60 n.sec;
   yet not degraded by read-out (e.g., on repeated playback).

1-A. High S/N: (adequate read-out)
   Signal to noise ratio (for adequate read-out) on the order of about 30-40 dB or more.

2. "Archival Stability": (10+ years life):
   Able to be used or stored in "normal computer environment" without dropping below min. read-out for at least 10-15 years.

3. "Computer records":
   Assume capability to operate with present day high speed digital computers—e.g., with at least the same capabilities as today's magnetic disk storage equipment (e.g., bit density of about $10^6$ bits/cm$^2$ or better).

4. "Deposit-able"—suitable film(s) can be deposited on "commercial scale" and give repeatable, controlled characteristics.

5. Overcoat-ability: absorber film (e.g., up to a few mils thick) can be coated to mechanically protect it and defocus "surface dirt" without sacrificing above features, e.g., still give adequate read-out (preferably overcoat can also impede heat and contaminant-gases, etc. from absorber film).

Thus, it is an object hereof to provide the foregoing, and other related, features and advantages. A more particular object is to do so teaching gold as such absorber (information) films. Another object is to teach such films exhibiting good sensitivity, even with low-power lasers; as well as extended archival life. A further object is to teach formation of such records apt for recording without apparent need to generate "pits" or like voids in the information layer. Another related object is to do so without need to melt or significantly soften the information layer; i.e., developing "altered reflectivity" bits ("pseudo-holes") while keeping the layer well below its melting point.

BRIEF DESCRIPTION OF THE DRAWINGS

These and other features and advantages of the present invention will be appreciated by workers as they become better understood by reference to the following detailed description of the present preferred embodiments, these being considered in conjunction with the accompanying drawings, wherein like reference symbols denote like elements:

FIG. 3 is a plot of absorber reflectivity vs. gross temperature.

DETAILED DESCRIPTION OF THE INVENTION

Figure 1:
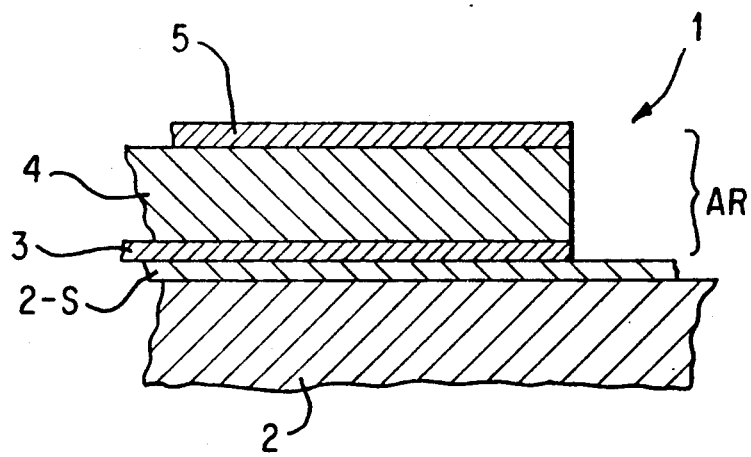
FIG. 1 provides a cross-sectional view of an idealized portion of a prior art recording medium.

"Te Example"; Tellurium absorber; (prior art):

FIG. 1 is a schematic illustration of an idealized cross-sectional view of an optical recording medium 1, generally along the lines of what is presently taught in the literature for Tellurium (e.g., see Ash article). Medium 1 comprises a support 2 on which is provided an "anti-reflective" substrate AR and, on AR, an information layer ("absorber") 5.

Preferably substrate AR comprises a "reflector" layer 3, on which a transmissive "spacer" layer 4 is laid. Layers 3 and 4 may be characterized as, respectively, primarily-reflective-transmissive at the contemplated read/write wavelength. Layers 3, 4, 5 will be understood as providing a multi-layer low-reflecting (anti-reflection) design over most of the visual spectrum as known in the art (see Ash article).

Support 2 preferably comprises a polished aluminum disk of the type presently used in digital magnetic recording for computer disk drives, coated with a subbing layer 2-S adapted to render a satisfactorily-smooth, flat surface for deposition of reflector layer 3. A radiation (laser) beam of prescribed energy and wavelength may be understood as applied to medium 1 from a laser source L, so as to establish a "hole" or like "deformation" on layer 5 as "writing" takes place, e.g., at site "v" shown in phantom.

Prior art record 1 in FIG. 1 will be understood as undertaken and described principally to provide a means of comparison and distinction for the invention embodiments in the following examples. And, except as otherwise specified, all materials, methods and devices and apparatus herein will be understood as implemented by known expedients according to present good practice.

Here, the metallic recording film 5 will be understood as deposited on the "transparent" dielectric spacer 4, with both thicknesses selected to yield a known low-reflectivity structure (e.g., as in Bartoline article, where less than 3% reflectivity with 5 nm Ti on 80 nm $SiO_2$ spacer recording at =488 nm). Then, where each "pit" (bit) is recorded, this "anti-reflective" background will be disrupted such as to yield "bits" adapted for high-contrast read-back. And where the recording wavelength is shifted, the spacer thickness is readily altered to give like results.

Workers will recognize that in certain cases the reflector film may be eliminated (e.g., in favor of a "dielectric mirror") and that spacer 4 may comprise other materials/structures (e.g., several layers of like material that is also more insulative thermally).

Thus the coating parameters here will be understood as selected to preferably provide an "anti-reflective" condition for the so-coated disk at the contemplated recording frequency when the write beam is focused on this absorber layer. [Regarding such see: "*Anti-Reflection Structures for Optical Recording*" by Bell and Spong, Journal of Quantum Electronics, Vol. QE 14, No. 7, July 1978; and for general prior art, see exemplary articles: "Optical Disk Systems Emerged", IEEE Spectrum by Bartolini, et al, August 1978, page 20; and Optical Recording Media Review" by Bartoline, SPIE Proceedings, Vol. 123, 1977, ("Optical Storage Materials and Methods", page 2).

Preferably, deposition proceeds until the reflectance of layer 5 reaches "effective zero" or another predetermined minimum-reflectance level. As workers know, this may be done empirically, or by continually monitoring the reflectance of the absorber film as 5 is deposited [and see deposition techniques described by Zech in his cited article].

Thus, one may vapor deposit an opaque layer 3 of aluminum onto 1c Support 2 (all optical characteristics taken relative to contemplated R/W laser spectrum of 4000-9000 Å). Then, a layer 4 of $SiO_2$ (or like "transparent" dielectric) is vapor-deposited on layer 3 to a prescribed depth, this depth related to λo, the operating wavelength (—here, preferably slightly less than either ¼ λo or ¾ λo). Atop layer 4 is vapor deposited the absorber film 5 to a depth which produces the initial minimum (near-zero) reflectance (see below).

The reflectivity of the record medium 1 will be understood as modified at each bit-site "v" by the radiation beam from write-laser L, so that, upon detection with a suitable means, the "void areas" v (i.e., "bits") may be distinguished as relatively "high reflectance spots" from the low reflectance "non-void" surrounding them, as known in the art.

For instance, U.S. Pat. No. 4,285,056 to Bell describes a like medium where information is recorded as openings in both the absorber and transmissive spacer layers, with the lengths of the openings and of the unexposed intervening areas being varied along a specific information track to convey frequency information. This patent also calls-out various materials (e.g., among them titanium, rhodium, platinum, gold, nickel, chromium, manganese and vanadium) to be deposited using standard evaporation or electron beam evaporation techniques.

However, Bell diverges from what is contemplated here in requiring that his spacer layer be heated by the write beam—heated sufficient to either be itself ablated-away, (i.e., to otherwise develop a void within itself) or else to be decomposed or sublimed and then out-gas sufficient to cause a "bubble" under a super-layer (e.g., of gold)—yet in the present case, essentially no energy is to be absorbed by the analogous spacer layer.

Preparation of absorber layer 5; (FIG. 1):

Absorber layer 5 preferably comprises a relatively thin layer of tellurium which is vapor deposited onto spacer layer 4 (on a relatively flat—~≦1/20 λ—record-surface thereof), preferably to a depth determined by monitoring this "tri-layer coating" to yield the "initial minimum reflectance", (typically, one to several hundred Å). The Te was so evaporated in a high vacuum chamber using a refractory metal boat for a source 1.2 m box type coating chamber used in Ash article]. Tellurium is a "low melting point/poor conductivity" metal commonly preferred by workers because it is felt to exhibit superior sensitivity, thus minimizing required (threshold) laser write-power.

For instance, this is expressed in U.S. Pat. No. 4,222,071 to Bell and Bartolini, where similar tellurium films were characterized as requiring laser-power on the order of 15+ mW for writing thereon (to achieve adequate read-out, about 20% optical efficiency being assumed—the goal being to permit recovery of recorded video signals with about 45–50 dB S/N, or "broadcast quality" read-back).

[They also specified a solid state Ga-AL-As injection... laser, apparently applied in a continuous beam one (1) micron in diameter at the record surface, the while kept moving past this beam].

U.S. Pat. No. 4,222,071 stresses that the absorber must be a "low melting point metal" like Te (as well as being deposited in a "continuous film", and not as "microscopic agglomerates").

Substrate 2 comprises a flat, aluminum plate polished to desirable flatness and coated with subbing 2-S to accommodate deposition of thin reflector layer 3 (high reflectivity over at least the "working portion" of the contemplated radiation spectrum). About 600–900 Å of aluminum vapor deposited has been found satisfactory.

The spacer 4 is likewise deposited atop reflector 3. Spacer 4 is a dielectric material which is relatively transparent to the "working portion" of the laser spectrum and preferably also exhibits good thermal properties (e.g., good insulator, low thermal capacitance). About 1100 Å of vapor-deposited $SiO_2$ (silicon dioxide) has been found satisfactory for the subject purposes (e.g., write/read at $\lambda = 6330$ Å). The Tellurium absorber layer 5 will be understood as highly absorptive of the contemplated recording laser spectrum (e.g., typically 25% absorptive; 30% reflective, with about 45% of the beam energy transmitted (for tri-layer cancellation, must transmit more than reflect).

The thickness of absorptive layer 5 depends on that of spacer 4 and should be minimal, only that sufficient to render the "Dark Mirror effect" known to workers—being deposited on its anti-reflectance substrate, only until reflectance is first minimized.

Workers would view the Te absorber 5, with its low melting point and a relatively short thermal diffusion length (poor conductivity—thus helping conserve incident laser energy) as a good, high-sensitivity material. When a write beam form laser source L falls upon site "v" of layer 5, a small portion of its energy will be reflected, a small portion absorbed and a large portion transmitted—the transmitted portion being reflected back by layer 3 to be (principally) absorbed in layer 5. Hence both incident and reflected energy will heat film 5, minimizing transmission losses (deposition of 5 to yield "tri-layer").

Results:

For instant purposes, "Sensitivity" will be understood as: characterizing the write-energy $E_w$ necessary to change reflectivity (or a like read-out characteristic) sufficient to give the desired minimum read-out.

The intensity and time exposure of the focused Write-Beam will be understood as sufficient to so elevate the temperature of absorber layer 5 as to cause the indicated change in reflectivity (at v sites) giving the desired read-out quality, etc. (e.g., so that adequate contrast, S/N ratio) may be realized, as understood by workers in the art. —cf. and exemplary S/N ratio of 40–50 dB (peak-to-peak signal vs. RMS noise) for a bandwidth of about 15 MHz.

Here, test recording is performed with a gas (1–10 mW He—Ne) laser beam operating at 6330 Å, with recording exposure from 30–470 n. sec., (usually 10 mW, 40 n. sec. or about 400 pJ—this intended to yield minimum adequate read-out, or about 40+dB S/N, when read at lower power; e.g., viz: 150–500 $pJ/cm^2$, $pJ = 10^{-12}$ watt-sec. or Joules). with the same or similar laser equipment. Note: for this contemplated setup, assume laser focused bit site ~½–1 micron diameter, need for write-pulse about 40 n. sec. long [60 n. sec. from rise to fall—this also accommodating disk rpm ~1800 and galvo-mirror focus characteristics].

The subject record 1 is so-recorded upon. It is found (relating to comparable situations in the literature, etc.) that relatively low-power laser pulses can melt the Te film sufficient to yield the well-known "craters" or "holes" and give good read-out (e.g., bit reflectance of ~50% vs. background of 1–3% at $\lambda = 6330$ Å)—however with quite a bit of "noise" too.

Such "bit holes" will be seen to be actual voids (e.g., see photos in Ash article where 2–10 mW, 100 n. sec. laser pulse recorded such "holes" in like Te films—there, it was assumed that a 250 A° film of Te used in the reflective mode produced 57% reflectance, 6% transmittance, 37% absorptance at 4500 A°). However, despite the fact that such Te films are deposited as a continuous layer, the formation of the "bit holes" (v) is described in the literature as accompanied by a surrounding rim—and it is thought that this rim is responsible for (much of the mentioned "noise".

Evidently one needs a certain MIN. Write-Energy $E_w$ within a certain minimum rise-time (e.g., with this laser, etc. about 10 mW within 40 n. sec. to render adequate "holes" (e.g., higher power delivered too slowly can allow heat-at absorber to leak away; thus no "bit" is written).

Such "holes" or "pits" are indicated by the hole at "v" in FIG. 1. At least some of the absorber material 5 is then evidently softened and displaced at the bit-site, sufficient to reduce its thickness there and so give increased reflectivity (at least that is what the art conventionally teaches, e.g., see Ash article and cited U.S. Pat. No. 4,222,071).

Such a spot may be read-out with means known in the art, e.g., with a similar laser at low power (e.g., above described laser at 3 mW), the increase in reflected energy received (at a suitable photo-detector) is observed to yield on output signal representing the recorded bits, these being readily distinguishable from background—this read-energy being insufficient to "erase" or disturb the so-recorded bits, of course. [Note: read-out at a frequency $f_R$, where "pit-depth" introduces a phase change vs. light reflected at surface of Te such as to maximize contrast therewith].

Archival stability:

We found that the archival stability of this "Te record: was extremely poor, as the literature has noted (e.g., see Ash article re oxidation, etc.). For instance, under known temperature-humidity cycling, record 1 will be found (using no overcoat or layer 5) to lose 50% of its reflectivity in about 50 weeks, evidently mostly via oxidation, etc. The Te film of Example I will be found characterized by a rapid increase in overall optical transmission after such "aging". This is presumably caused by a general oxidation of the metal as well as severe selected site-attack beginning at "defect sites": in the metal film. (cf. analogous test per MIL SPEC #810-B).

This is grossly inadequate for the mentioned "archival memory" requirements (at least 10–15 years exposure to normal computer operating/storage conditions; see Table I).

EMBODIMENT EXAMPLES

The following Examples are given by way of teaching some exemplary uses and advantages of "low temperature" absorbers according to the invention. Advantages and features thereof will be better appreciated by comparing them with the "Te Example" described above.

Figure 2:
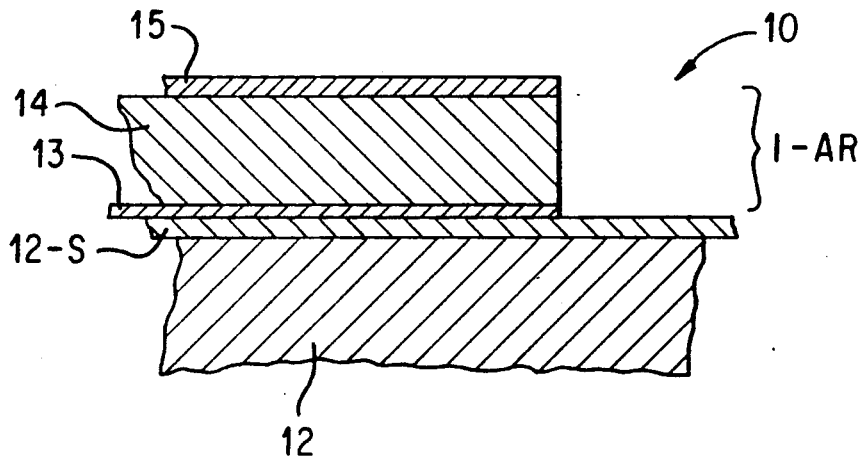
FIG. 2 provides a similar view of a novel preferred recording medium embodiment exhibiting a construction in accordance with principles of the present invention.

Example I; Au absorber; (FIG. 2)

The operations, materials, methods and structure of the "Te Example" (FIG. 1) described above are essentially duplicated here, in a "gold record" 10, except as otherwise specified.

Record 10 will be understood as comprising a substrate-support 12 on which an "anti-reflective" substrate 1-AR is laid (preferably comprising a reflector layer 13, with a transmissive spacer layer 14 laid upon 13) with an absorber film 15 placed atop substrate 1-AR (spacer 14 thereof). Here, absorber 15 comprises a film of gold deposited like the Te film in the "Te Example", to a similar depth by essentially similar means. The underlying spacer layer 14, reflector layer 14 and substrate 12 are (at least functionally) otherwise the same as in "Te Example" and will be understood as also functioning as a "tri-layer".

That is, this gold absorber film 15 is preferably formed (as in "Te Example") by vapor depositing gold on the surface of $SiO_2$ spacer 4 until the well known "tri-layer" is rendered (i.e., until surface-reflectivity of 5 first goes to zero or "near zero").

Results:

The results are most surprising, especially in light of expected properties and as compared with conventional media like the Te absorber described in "Te Example". That is, record 10 was recorded-upon, read-out and evaluated, with its sensitivity, etc., measured, as in the "Te Example"—i.e., using an He—Ne laser system of the type mentioned. The so-written bit-sites exhibited a like increase in reflectance and higher output signal as with Te. As detailed below, one finds this yields a record with fine archival stability, unexpectedly-high sensitivity, high S/N and surprisingly low write-energy, and low write-temperature—plus overcoat tolerance; yet one observes only "reflectance transitions" with no "pits" or like deformation of the absorber.

"Archival stability" (resistance to environmental degradation): was found to be far superior to that of the Tellurium record in the "Te Example" (and to that of any known tellurium "pit" records); for instance measurements of change in optical reflectivity after "aging" (under a cycled elevated temperature/high humidity environment) indicate that this alloy is considerably more stable then closely-similar Tellurium films. And workers are well aware that gold is equal to such "archival" conditions as required here. It is projected that such "gold records" can maintain adequate read-out (30+dB) for the order of ten (10) years or more of the contemplated storage and use.

Unexpected "high sensitivity":

We found to our great surprise that such a thin gold alloy absorber can be approximately as "sensitive" as a Tellurium absorber (e.g., about ½ that of "Te Example" is common)—e.g., that information can be recorded in the 5–15 mW, 10–100 n. sec. power range (or 100–1000 p.J.)—specifically about 5 mW for as little as 40 n. sec. is seen to "switch reflectivity"; some samples even "switch" in about 10–15 n. sec. at 1–2 mW; others in less time at 10 mW—all yielding satisfactory read-out (e.g., 30–40 dB S/N, etc.). This is really astonishing—it is many times the value our theory predicted and is really contra to what the literature conventionally teaches!.

That is, compared with known accepted "good absorbers" like Te, gold has such a relatively high melting point (about 1100–1200° C. vs. about 450° C. for Te) and such superior heat conductivity (that of Te is notoriously poor), that one would have to expect a gold absorber to exhibit sensitivity far inferior to that of Tellurium. For instance, the literature extols Te as having sensitivity which is vastly superior to Titanium, and Titanium has a high melting point like gold but is as poor a heat conductor as Te—thus how can gold be a better absorber than Titanium?? One reason (see below) may involve the very different mechanism for such "bit formation", i.e., whereby, unlike Te, etc., no deformation (e.g., pit, bubble, etc. formation) is involved here; but rather something else serving to change reflectivity when subjected to such a write-beam, and evidently requiring considerably less write-energy.

Low temperature recording:

A major surprise is that the indicated "reflectance transition" occurs at such low (write-) power levels and evidently at such low temperatures [see below, Examples show that this occurs well-below golds melting point]. Thus surprisingly high sensitivity, in turn, allows one to turn to "high-melt" material like gold which has superior archival properties, alleviating risk of corrosion, degradation over extended life.

Writing "transitions" without "deformation" of absorbers:

An even greater surprise ensued when the so-written record (with low power, low T°) was examined for the usual "pits" ("holes" or like deformation as with Te films). After careful investigation (e.g., with scanning electron microscope), no evidence of "pits" could be found !—and results were found that were unexplainable by pit formation! films of this type, when so written-upon (i.e., suitable laser energy, sufficient to yield significant read-out reflectance differences, as here), have definitely exhibited "pits" (i.e., displacement of absorber material at bit-site)—as workers well know. Example I is a case in point.

This is so unorthodox that many of out co-workers refused to believe it for sometime. But to date, having found no convincing evidence of "pits" (a negative fact to be sure—subject to possible explanation later), we must believe that there were none. It is possible, of course, —indeed likely—that greatly increased write power will generate such a hole or pit. And, one cannot be sure that present "deforming materials" like Te will not reset similarly under the "right" conditions.

Our best theory (as yet not fully worked out) is that, without forming any such "pits", this thin (pure gold) absorber film is so deposited (e.g., on tri-layer) as to be capable of being radically changed somehow by the usual write-beam so as to exhibit a significant difference in reflectance (vs. background), —almost exactly as other known absorbers like Te have done in the course of forming "pits". We characterize this as "reflectance transition" for lack of a better term.

We are not yet sure of the casual mechanism—e.g., whether it results from some solely-internal change in phase, or in crystallinity, in density, etc. (perhaps akin to the photo-polymers in Bartolini article cited above), or whether one or several interior micro-sites are so formed.

This strange absence of "deformations" and apparent lack of melting, coupled with the unexpectedly low write-energy ($E_w$), leads us to infer that the so-written "reflectance transitions" occur because of internal, relatively microscopic changes in the gold film—as opposed to the conventional "macroscopic" changes like pit forming (and one can infer that the latter reasonably should require more write-energy). We theorize that such transitions are peculiar to "ultra-thin" films of this type (on the order of 100 to several hundred Å $\pm 50\%$). One could further surmise that such films exhibit special properties unrelated to those of the "bulk metal"— properties attributable (in part at least) perhaps to the relative prominence of metal substrate bonds (e.g., Au—$SiO_2$ bonds vs. Au—Au bonds). And we expect that for thicker films (more like "bulk metal") more write-energy would be required—if indeed such "transitions" are possible (e.g., Au—Au bonds predominate and are stronger).

Now this new type of "phase transition", or rearrangement of absorber structure under mild heating, may result (at least in some cases) when the absorber is deposited as an ultra-thin "semi-continuous" film which the heat of the write-beam can coagulate into colloid (more discontinuous) form. Such a result might be analogized to the "ruby glass" phenomena known in the glass industry [see "Coloured Glasses" by W. A. Weyl published 1951 (Reprinted) by Dawsons of Pall Mall, London 1959]. This could, in effect, "optically eliminate" absorber 15 of the tri-layer, eliminating the associated "phase-cancellation" and letting reflectance from reflector 13 only, take-over [e.g., "colloid-islands" with diameter of a few Å vs. beam 1000 X wider].

In any event, workers will certainly welcome the availability of such novel gold absorbers, not only because of their evident ease of manufacture (deposition, handling) by well-known methods and properties, and their evident superior archival stability and aptness for use in computer disk records (e.g., per Table I), but also because writing such "transitions" implies special unique advantages—e.g., dipsensing with need to melt absorber, or to "roll aside" absorber mass to form a "pit", absence of typical "pit-rim" giving rise to "read-out noise", and associated unconcern wit constrictive effects of over-coatings (e.g., a protective film covering the ordinary pit-forming Te absorber will be expected to "squeeze" the pit site sufficient to retard pit-formation); also, the associated reduction in write-energy and record temperature—all these promising the ability to "laser-write" with much less energy and to write smaller bits! Workers will welcome a system whereby bits may be recorded without the intense heat and macroscopic changes inherent in the well-known pit formation.

Overcoating; effects:

The "Te Example" was also run with a thin overcoating of SiO (100 Å°, vapor deposited) on the Te film. This was not really a true, functional overcoat of the kind workers have suggested (e.g., several mils thick, to permit record handling, without scratching to "defocus" surface dust, grime; etc.; to impede vapor entry, e.g., water, oxygen; to further conserve writing heat, etc.); but did effect "pit formation", raising required write energy to about double! (Possibly because it so "squeezed" Te film at pit-site as to impede associated displacement of Te material there). And workers are aware that such "deformation media" (as with pits in Te, bubbles in other metals, etc.) cannot tolerate such an "overcoat" (e.g., read-out signal destroyed; sensitivity raised).

Significantly, when an Au film as in Example I was similarly over-coated, no such effect was seen (e.g., same write-energy to generate "pseudo-pits"). As workers will see this reinforces the theory that the instant "transition" mechanism is quite novel (no movement of Au metal to form "pit", etc.) and amplifies the attractiveness of such absorbers (tolerance to overcoating is very, very important). Evidently the involved "reflectance transition" is more tolerant of the usual overcoat. For instance, coating such a pure gold tri-layer with several mils of transparent TEFLON (trademark of DuPont, or other suitable tetrafluoro-ethylene material) doesn't radically disturb its record properties (e.g., sensitivity, read-out drop only a bit—vs. with Te, cannot record at all, at this power level). This compatibility of gold absorbers with such elastomeric insulative overcoatings is a very welcome feature. To our knowledge, this is the first such absorber that accepts such overcoatings while maintaining good record properties (sensitivity, S/N, archival, etc.).

As another feature hereof, and based on the foregoing and other Examples, one would infer that such an ultra-thin absorber film (or gold) is probably not behaving as predicted from reported "Bulk" (Gold) properties (e.g., thermal conductivity—e.g., radical conductivity cannot be significant). The discovery of such "thin film properties" is significant and is further mentioned below.

By way of showing that these "transition bits" (reflectivity-switching) occur well-below the melting temperature (of gold) and involve no "pits" or other deformation, Examples II-V follow.

EXAMPLE II; Gross heating:

The record of Example I is essentially replicated with pure gold deposited on the same tri-layer to same depth of Example I. However, rather than subjecting it to a laser write beam, the record is simply heated, rather crudely, at several spots with a common soldering iron. The spots are heated to a "transition temperature" (-range, considerably below the melting point or the softening point) where a radical change in color is observed (extreme change in gross "eyeball-reflectance" occurs rather suddenly).

That is, we slightly heated spots on this "pure gold" absorber sample, with the solder iron heated to about 550° C. (estimate is maximum T° of iron, and is well below gold's melt point of 1100°-1200° C.)—and we found to out surprise that the "eyeball appearance" of each so-heated spot changed very radically (from a relatively low-reflectivity dark blue, to a high reflectivity "white" - pale violet). Again, examination failed to find any evidence of "pits".

EXAMPLE III; as II, but Au/Pb

Example II is repeated, however with a gold-lead alloy replacing the pure Au. The results are essentially the same except that they occurred a bit faster (at lower T° as sample warmed-up). This strongly suggests that various gold alloys can be made to yield these inventive results (high-sensitivity; "write" with very low power and well below melt point, etc.).

Another like sample (Au/Pb) is made and is write, then read-out as in Example I. Results were much the same as Ex. I (pure Au) except that sensitivity was a bit higher (higher than in "Te Ex." too!).

Example III-A: I; but Au/Sn

Ex. I is replicated, however substituting an Au/Sn alloy for the pure gold absorber film. Results were quite similar to Ex. II, with a minor drop in sensitivity.

The "alloys" in Ex. III and Ex. III-A are, really separate Au, Pb or Sn layers vapor-deposited (as in Ex. I) individually and sequentially [e.g., Au, then Pb, then Au, then Pb, then Au to a total depth giving "initial zero reflectance" as in Ex. I]. Thus, they are better characterized as "laminate-mixtures".

Example IV; Au, on glass only; torch-heating

Example I is repeated except that, instead of a "tri-layer" substrate, only a glass sheet is used. The same deposition is carried out, with the Au film vapor-deposited to the same "tri-layer depth" (e.g., in common chamber with a second tri-layer sample, keeping deposition time the same for both samples, while monitoring tri-layer reflectance as in Ex. I).

Results were closely similar (color change at estimated 450° C., with radical change in reflectivity occurring; however heating was with a "blow torch".

The temperature in Examples II, III and IV were estimated, not precisely tracked. This was remedied in the Example V below.

Example V: as I, oven heating, T° monitored

Example I is replicated (pure Au on tri-layer). However, the sample is heated in an oven (not laser written) and its temperature carefully monitored (with thermocouple) along with its reflectance (5 mW He—Ne laser at 6330 Å and associated detector and read-out means).

FIG. 3 is a resultant plot of oven/record temperature vs. reflectivity (reflectance scale arbitrarily chosen—#0.5 corresponds to ~5% refl.; #20 to ~90% reflectance). This plot confirms that such "mild heating", kept well below gold melt T°, will, of itself, induce a radical change in reflectance; cf gradual change from about 200°–400° C.; then sharply from 400°–550° C.; (here, entire sample surface is heated—no melting observed).

Workers will agree that the gross macroscopic color transitions observed in Ex.s II–V above, under such "mild" (non-melting) heating certainly confirms that such "reflectance transitions" in a gold film have nothing to do with forming "pits" or any other deformation.

This is exciting on several counts—e.g., promising "low-T° writing" (low $E_w$), elimination of read-out noise associated with the ridges that usually form around such "pits", higher bit density, ability to "so-write" on noble and like "archival metals with a relatively high melting point.

Example VI—as I, but elastomer substrate

Example I is replicated except that a glass slide is substituted for disk 12 and a transparent TEFLON coating is substituted for SiO$_2$ spacer 14. The same kind of vapor deposition is undertaken, e.g., Al film 13 on glass slide until monitored reflectance is maximized, then Teflon to "spacer-thickness" as before, then pure Au deposited until "first minimum reflectance" (of companion tri-layer sample).

Results: Results are similar to those of Ex. I only better, for instance, exhibiting about 4 X sensitivity. And adequate "transitions" (for read-out) can be written with the same He—Ne laser at power as low as about 1–1.5 mW (40 n. sec.—"threshold level"). As before, no evidence of "pits" etc., is seen (e.g., with scanning electron microscope). Also, adhesion of the gold was also superior (vs. SiO$_2$).

Evidently the elastomeric spacer, (TEFLON) greatly improves writing efficiency, keeping write-beam heat localized at the "bit site".

Example VII:—as VI, elastomeric overcoat

Ex. VI is replicated except that an overcoat of 2000 Å transparent TEFLON is applied on the gold absorber film.

Results: Results are almost as good as in Ex. VI: with some drop in sensitivity. It is even possible to write "transitions" at laser power as low as 0.1 mW if a 30 sec. exposure (approximately) can be tolerated.

This result would be very unexpected if the bits were written according to prior art mechanisms (e.g., forming "pits"). That is, conventionally, one expects such an overcoat to radically degrade sensitivity (require more write-energy). For instance, as mentioned above, an overcoat on a Te film as in "Te Ex." prevents writing entirely (with reasonable power levels, like the described 10 mW). Workers have surmised that the apparent spot increase in needed write-energy (for "pit forming") stems from the overcoat "squeezing down" on the absorber, resisting translation of its mass as a "pit" begins to form.

Thus, the instant results are not only surprising and advantageous but tend to confirm that the involved novel "transition" mechanism (and related "transitional absorber" material like Au) is quite unrelated to forming pits or other deformation. And workers will welcome such novel ODD records and associated systems where overcoating appears so feasible.

The foregoing will confirm that "mild heating" (to well below melt T°) of such a bit site in such gold films produces definite reflectance changes ("transitions") without any pit formation.

This susceptibility of such thin absorber films of gold for recording bits (adequate change in reflectance, etc.) by such "mild heating" well below the melt point, holds great promise for improved recording systems. As workers will attest, any improvement that can significantly reduce write-energy requirements should, of itself, offer tremendous potential. For instance, the present state of the art is such that a mere 25%–50% reduction in required write-laser power could render systems cheap, reliable and practical, that are presently questionable—thus our invention could make a commercial system out of what is now a mere laboratory curiosity.

Workers will appreciate that one will also expect to be able to so use gold, and its compatible alloys, in other related circumstances (e.g., gold deposit on another kind of substrate where such "mild heating" at "bit sites" yields useful variance in reflectivity). In such cases, one will expect to formulate the gold (or an alloy thereof) to meet the operational requirements (e.g., as in Table I, sufficient gold, etc. in alloy to yield adequate archivalability, sensitivity, etc.). Then, by whatever means one will expect to (experimentally or in theory) determine the write energy $E_w$ needed to achieve such "reflectance-switching" and relate this to the recording context (—i.e., to laser power and exposure time at $\lambda_0$, to thermal environment of absorber film, accounting for full-system in respect of optics, reflectance, heat losses to adjacent layers, etc.) —and "test-heating" of the contemplated record as in the above Examples can be undertaken to derive or confirm this.

And workers will also appreciate that other materials should be contemplated for like application. Thus, similarly one will expect to be able to select another such "transitional absorber" (e.g., like Ag, Cu, or their alloys), properly formulate it, determine the related write-energy $E_e$ to yield to expected "reflectance-switching" and relate this to the involved recording context —perhaps test heating a given absorber film thereof on its intended substrate in a temperature monitored oven, to determine, or confirm, what is the necessary film thickness, substrate character, laser energy, etc. And test-writing and read-out of the associated record will, of course, give further indication of operating characteristics and conditions.

Figure 4:
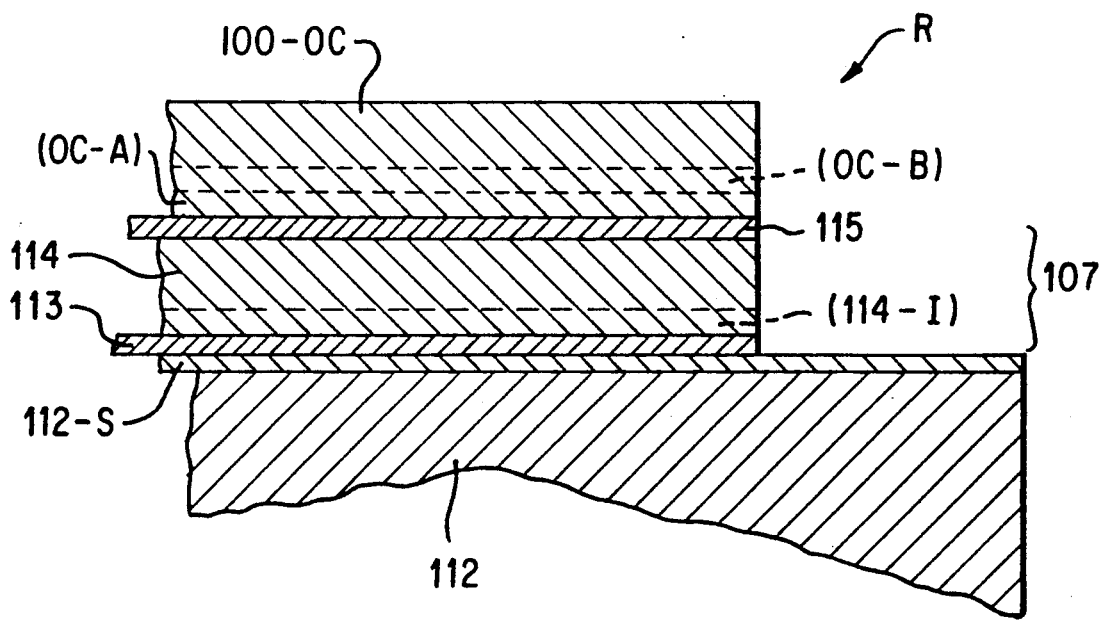
FIG. 4 is a similar view of a preferred disk record embodiment.

Example VII: preferred R/W ODD disk; FIG. 4

FIG. 4 depicts, in fragmentary idealized section, an improved ODD disk record R apt for use in "low power" R/W laser systems, e.g., of the type shown in FIGS. 5–7 and described below. Record R comprises a substrate disk 112 on which is disposed a gold tri-layer 107 including a gold absorber film 115 atop an anti-reflective optical substrate comprised of dielectric spacer 114 on reflective layer 113. Those elements and the associated materials, operations, etc. may be understood as essentially the same as in Ex. I except as otherwise stated. Record R is capped with an overcoat 100-oc upon absorber 115. Further details are as follows.

Substrate disk 112 is preferably a well-known Winchester disk of the type presently used for magnetic recording records in computer systems (aluminum, 14" dia., usual polished surface). Preferably it is coated, at 112-S with a "subbing layer" adapted, as known in the art, to provide a smooth surface for deposition of reflector layer 113.

Alternatively, the disk itself may be made as a tuned (to $\lambda_0$) dielectric mirror.

As mentioned, reflector 113 (Al film as before) and spacer 114 preferably provide an anti-reflective base on which absorber film 115 is applied to complete the well-known "tri-layer". Spacer 114 is preferably comprised of transparent TEFLON or like organic of "tri-layer thickness". Alternatively, $SiO_2$ or like "glass" may replace some of the organic, (e.g., center-portion,) leaving organic (TEFLON) above for good adhesion to gold, and as "thermal barrier" preventing reflector 113 from draining any appreciable energy from absorber 115 [stable under such heating].

Absorber layer 115 comprises pure gold vapor-deposited on the anti-reflective substrate 114, 113, etc. as before (to yield "first min. reflectance depth", etc.).

Overcoat 100-oc is next applied on absorber 115 to function, as known in the art, as a scratch-resistant "cap", a barrier to intrusion of contaminants (e.g., water, oxygen vapors) and to "defocus" dirt and grime thereon. That is, one may optically-eliminate (or at least reduce) the effects of surface dust, etc. (on 100-oc) by simply making it thick enough, albeit transparent to $\lambda_0$, to throw it out of focus when illuminating absorber 115 (e.g., here a few mils thick). Now, any dust particles settling on the overcoat surface are displaced far enough from the focal plane of the optical system as to have no appreciable effect on read/write operations.

Overcoat 100-oc may comprise a suitably-transparent glass. However, in certain cases, a barrier coating (e.g., 100 Å SiO and/or several hundred Å TEFLON) is first coated upon absorber 115. In certain instance, where flexibility is critical, the glass may be replaced by a flexible organic (e.g., "RTV silastic" of General Electric Co.) and in such a case a "wear-cap" will often be advisable (e.g., acrylic layer on RTV or as in U.S. Pat. No. 4,101,907).

Now, workers will recognize that one will use such a record by rotating it (e.g., 1800 rpm preferably here) while using the Write Beam to write a selectable number of information tracks, each track comprising a succession of spaced "bit-sites" ("Transitions" written there, as reflectivity changes), separated by unwritten areas in which the reflectivity of the absorptive layer 115 is undisturbed.

For read-out, a laser beam of relatively constant intensity and prescribed wavelength is likewise focused on the information track comprising these bits at the absorber layer as the disk is rotated. Thus a bit can represent a "one" where the write-beam has switched reflectivity along this track; otherwise a "zero" may be understood. The read laser will apply energy insufficient to so change spot reflectivity, and at a frequency at which the undisturbed regions of the track exhibit an "anti-reflective" condition, preferably. A photo detector is positioned to receive light reflected from the passing "bit sites" being used, as known to develop as output signal representing the so-recorded "bits". The reflectance changes need not be maximal, just sufficient to give the needed minimal read-out contrast (e.g., S/N ratio that can be tolerated in the contemplated playback mode).

Workers will appreciate how this teaches that one may use a thin film of gold as the absorber (information) means in a "low-radiation" record adapted for high-density digital data recording for data processing using low-power recording means, like a 10 mW laser, to "write" bits ("transitions") detected via reflectivity change. Evidently, other related absorber structures, related materials and related read/write systems will be applicable in certain instances. Below is an example of a preferred R/W system apt for using such a record.

Figure 5:
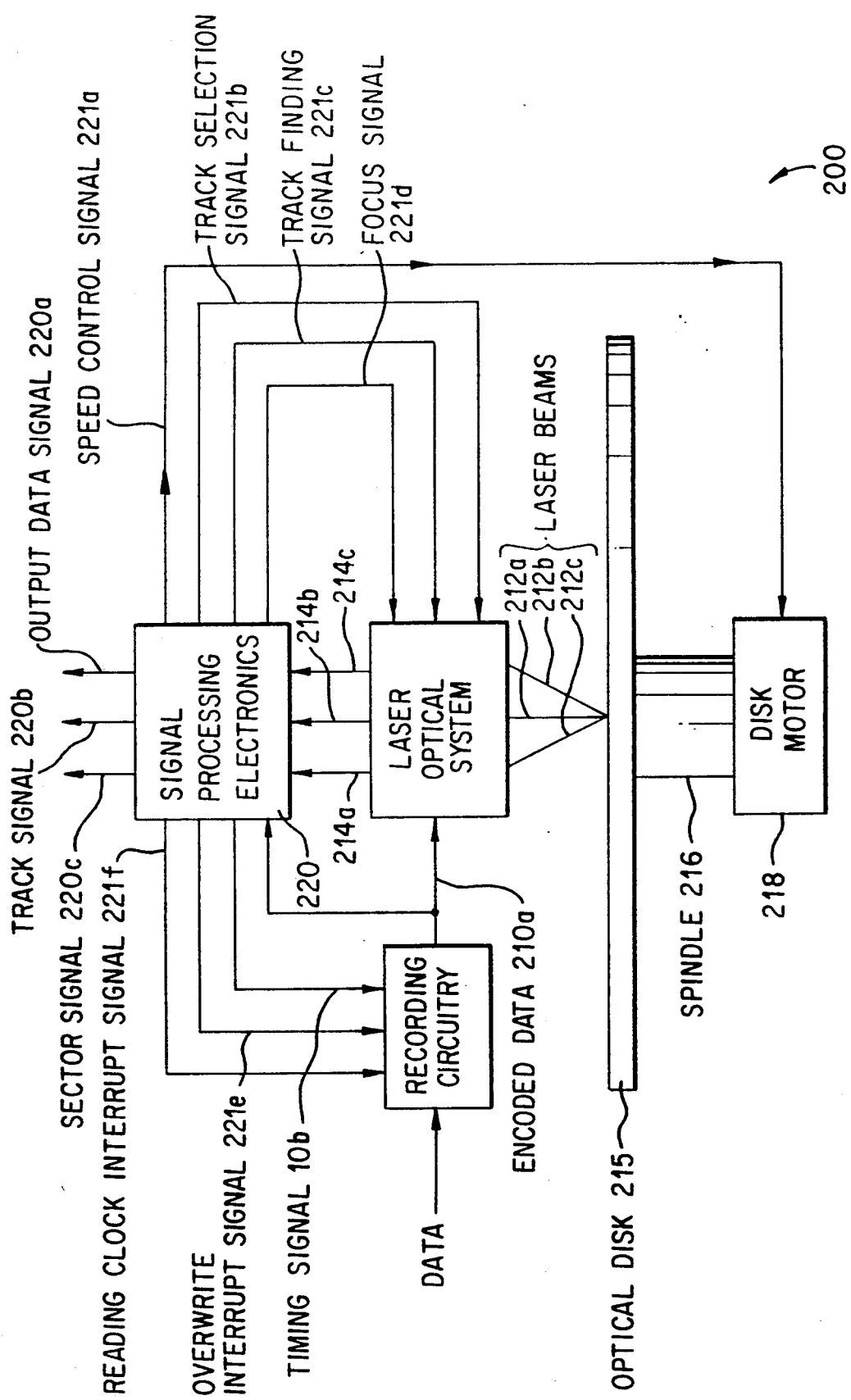
FIGS. 5-7 schematically indicate a record embodiment in a preferred application.
Figure 6:
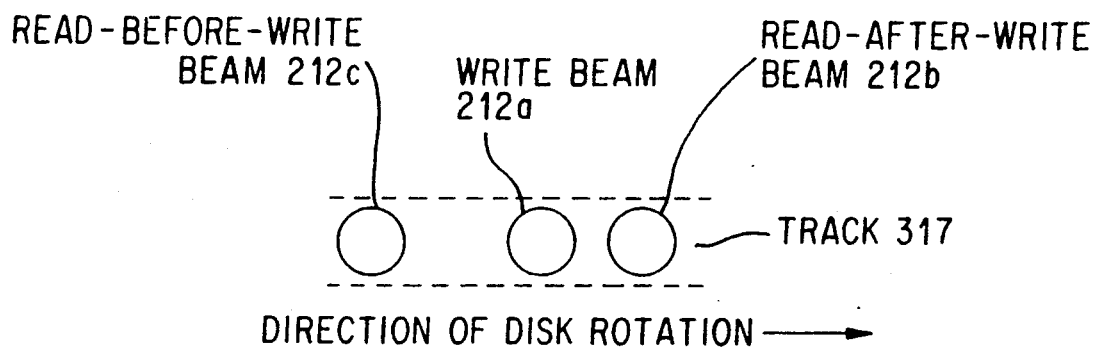
Figure 7:
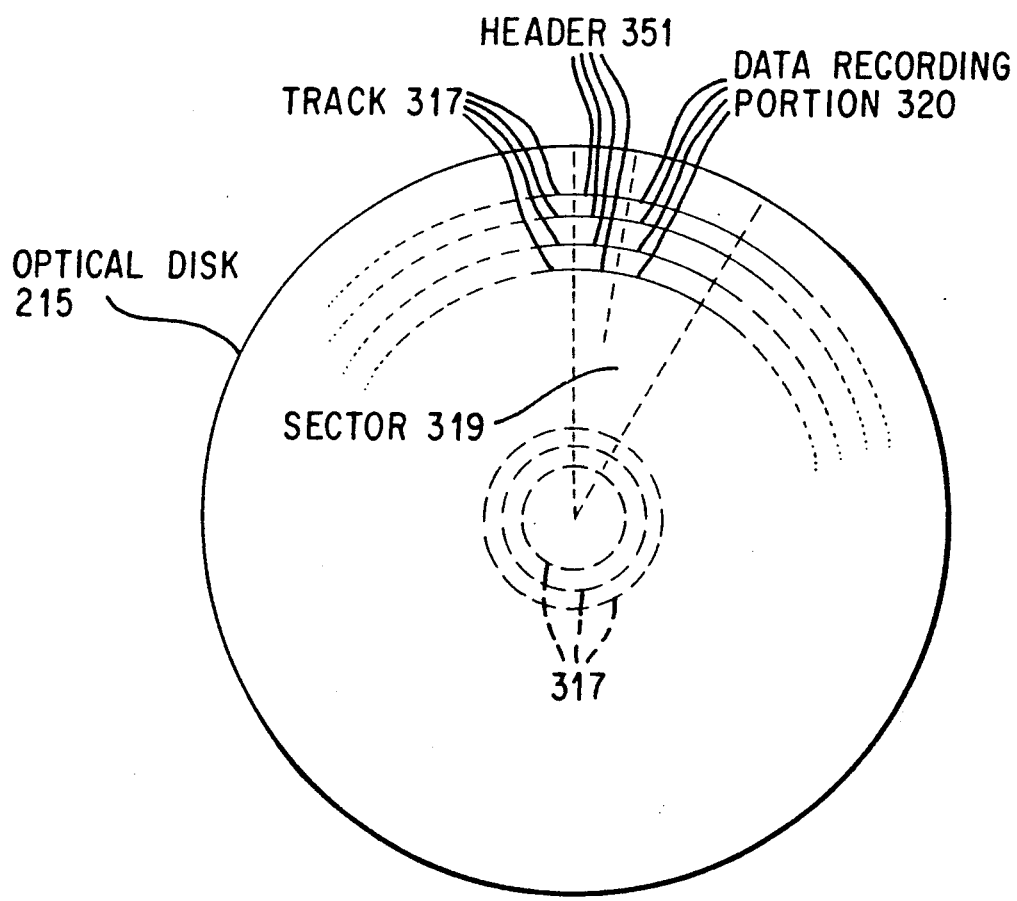

Associated low-power R/W system, FIGS. 5, 6, 7:

An example and preferred mode of using such a recording medium will now be briefly described with reference to a preferred related optical recording/reproducing system 200 in FIG. 5.

FIG. 5 generally illustrates a system 200 wherein data to be recorded is first applied to recording circuitry 210 which encodes the applied data using, for example, a conventional encoding format of the type employed for magnetic recording, such as non-return-to-zero, return-to-zero, etc. Conventional error checking may also be provided for the encoded signal.

The encoded data 210a from the recording circuitry 210 is applied to a laser optical system 212. The laser optical system 212 generates three laser beams 212a, 212b, and 212c which are focused at spaced locations along the center line of the same selected track of a preformatted optical disk 215 supported on a precision spindle 216 for rotation by a motor 218. Optical disk 215 may, for example, be a tri-layer disk of the type disclosed in the aforementioned Example VII.

Laser beam 212a is a writing beam which is modulated by the encoded data so as to form optically detectable changes in a selected track of the optical disk 215 representative of the encoded data. It is to be understood that the optically detectable changes (e.g., "bits") produced in the disk by the write laser beam 212a need involve no physical deformation such as pits or holes. The only requirement is that optically detectable changes be produced in selected areas of the disk in response to the write laser beam 212a which are representative of the encoded data 210a. For the purpose of this description, all of the possible types of optically detectable changes that can be produced will hereinafter be referred to as "transitions".

Laser beams 212b and 212c shown in FIG. 5 are reading beams. As typically illustrated in FIG. 6, the reading beam 212b is a read-after-write beam which is accordingly focused behind the writing beam 212a on the center line 217a of a selected track 217; while beam 212c is a read-before-write beam and is accordingly focused ahead of the writing beam 212a. The intensity of the read beams 212b and 212c are chosen so that they will not disturb the integrity of previously recorded information. The read beams are reflected from the disk 215 back to the optical system 212 which, in response thereto, derives a plurality of detection signals 214a, 214b and 214c which are applied to signal processing electronics 220. The signal processing electronics 220 also receives the encoded data signal 210a from the recording circuitry 210 for use in checking the accuracy of recorded data.

The signal processing electronics 220 uses the detected signals 214a, 214b and 214c to provide an output data signal 220a corresponding to data read from the optical disk 215, along with signals 220b and 220c respectively identifying the track and sector locations on the disk from which the data is read. The signal processing electronics 220 also produces control signals 210b, 221b, 221d, 221e and 221f. More specifically, control signal 210b is applied to the recording circuitry 210 for synchronizing the encoding of data with disk rotation; control signal 221a is applied to the optical disk motor 218 to provide accurate speed control during recording and reading; control signal 221b is applied to the laser optical system 212 for controlling the radial position of the laser beams 212a, 212b and 212c for the purpose of selecting a desired track; control signal 221c is applied to the laser optical system 212 for providing precise track following of the laser beams on the selected track; control signal 221d is applied to the laser optical system 212 for providing precise focusing of the laser beams 212a, 212b and 212c; and control signal 221e is applied to the recording circuitry 210 for interrupting recording if the reflected read-before-write beam indicates the possibility of an overwrite recording error because the track ahead contains previously recorded data; and signal 221g is applied to the recording circuitry 210 to interrupt recording if a recording error occurs.

Next to be considered is the manner in which preformatting is provided for the optical disk 215 in FIG. 5 in accordance with the invention. An example of a typical formatting arrangement is illustrated in FIG. 7.

As generally indicated in FIG. 7, the optical disk 215 in the preferred embodiment being described contains a large plurality of circumferential tracks 317. The disk 215 is also divided into a plurality of sectors 319. As indicated in FIG. 7, each track 317 within a sector 319 comprises a header 351 and a data recording portion 320. The data recording portion 320 is the portion into which data is written during recording and comprises the greater portion of the track length within each sector 319. The header 351 of a track 317 is encountered first in each sector 319 and is provided on the disk prior to recording. The provision of such headers 351 on a disk prior to data recording is typically referred to as "formatting" the disk, and the resulting disk is considered to be "preformatted".

Other details of system 200 will be understood by workers in the art representing "present good practice" (e.g., with regard to particulars of subsystems, devices, components, materials and related manufacture and operation). Examples of various known methods and approaches may be seen in the following references:

| Patent No. | Inventor(s) |
| --- | --- |
| 4,216,501 | Bell |
| 4,232,337 | Winslow, et al |
| 4,243,848 | Utsumi |
| 4,243,850 | Edwards |
| 4,253,019 | Opheij |
| 4,253,734 | Komurasaki |
| 4,268,745 | Okano | and in:

R. A. Bartolini, et al., "Optical Disk Systems Emerge", *IEEE Spectrum*, Aug. 1978, pp. 20-28.

G. C. Kenney, et al., "An Optical Disk Replaces 25 Mag Tapes", *IEEE Spectrum*, Feb. 1979, pp. 33-38.

K. Bulthuis, et al., "Ten Billion Bits on a Disk", *IEEE Spectrum*, Aug. 1979, pp. 26-33.

A. E. Bell, et al., "Antireflection Structures for Optical Recording", IEEE Journal of Quantum Electronics, Vol. QE-14 No. Jul. 7, 1978, pp. 487-495.

The subject matter of these references is to be considered as incorporated herein, as is that of all other references.

Conclusion:

Workers will appreciate how aptly such "transition-forming" records and related R/W systems are to provide novel, improved records for computer applications and the like. In particular it will be appreciated that such records can be used to improve the efficiency, power usage and the cost effectiveness of an ODD disk drive as mentioned —something workers in the art will applaud. Workers will also appreciate that such records and R/W systems for other like applications in related environment. For instance with such records modified to operate in other (R/W) frequencies and/or other related purposes (e.g., holographic recording).

It will be understood that the preferred embodiments described herein are only exemplary, and that the invention is capable of many modifications and variations in construction arrangement and use without departing from the spirit of the invention.

Further modifications of the invention are also possible. For example, the means and methods disclosed herein are also applicable to positioning other transducers and related loads in similar systems and environments. For instance, related embodiments may be employed to position transducers for other forms of recording/reproducing systems, such as those in which data is recorded and reproduced optically. And, while the principles of the present invention have been demonstrated with particular regard to the embodiments described, it will be recognized that various modifications are possible. For instance, the "records" disclosed in these embodiments can also be applied to other recording contexts; e.g., in different disk (read/write) environments where data is recorded and reproduced using other radiation beams.

Since the mentioned examples of possible variations are merely illustrative, the present invention will be understood as including all possible modifications and variations coming within the scope of the invention as defined by the appended claims.

What is claimed is:

1. A record blank for use over relatively long archival life with a recording radiation source providing a write beam at a given frequency range and relatively low write-energy, this blank comprising in combination:
    a substrate having a recording portion exhibiting prescribed optical and thermal characteristics at the given frequency range; and
    a prescribed information layer for recording information and overlying said portion of said substrate, this layer comprised of a "non-continuous agglomerating material" and exhibiting a prescribed absorptivity and initial unrecorded "virgin-reflectivity" at the given frequency range and being adapted to "agglomerate" and so be shifted to a read-out reflectivity on reception of said write-beam corresponding to information to be recorded on prescribed "bit-sites" thereof; said "agglomerating material" being selected and applied so that said beam may so alter said material reflectivity in the course of recording, with the material at each so-recorded bit-site so changing significantly in reflectivity yet without ablation or gross deformation or displacement thereof; while also providing good read-out contrast by comparison with the non-recorded areas exhibiting said virgin reflectivity.

2. The combination as recited in claim 1, wherein said substrate recording portion is anti-reflective and where said information layer material is deposited such as to minimize mass.

3. The combination as recited in claim 2, wherein the anti-reflective portion comprises an insulative spacer means disposed on reflector means and having a prescribed spacer-thickness, these functioning to support the information layer, this layer having a thickness such as to be partly transmissive to the write beam at said frequency range, and which thickness is so related to said spacer-thickness and to the optical properties of the spacer and reflector means as to, with the information layer, establish a "substantially anti-reflective" condition as said virgin-reflectivity for the record blank at the given frequency range; said information layer, said spacer means and said reflector means being combined into a "tri-layer" structure; and wherein the information layer is comprised of gold deposited in minimal mass.

4. The combination as recited in claim 1, wherein the information layer is comprised of gold.

5. An optical digital data record for use with a focused beam of playback radiation of a given frequency and a first playback intensity and also for recording with a focused beam of recording radiation of said given frequency and a second higher recording intensity adapted to write one or more information "bits" at selected sites, said record comprising the combination of: support means including a reflective surface portion;
    a first thickness of spacer material exhibiting good thermal insulation properties and being substantially transparent to radiation at said frequency, this material disposed on said surface portion;
    a "semi-continuous" deposit of information material of minimal mass disposed on said spacer material, and exhibiting some absorptivity, some reflectivity and considerable transmissivity at said given frequency, the information material being so selected and so deposited, in minimal mass, as to be "agglomerated" under said recording intensity and so alter reflectance from said information deposit under said play back beam at the bit sites, yet without ablating or otherwise expelling the material at the bit site; reflectance values being arranged to so differ that the as-written record will exhibit a given minimum signal-to-noise ratio during playback with said playback beam at said first intensity.

6. A record in accordance with claim 5, wherein the support means is a rotatable disc.

7. The combination as recited in claim 6, where the spacer thickness comprises a suitable polymer and the information material comprises gold.

8. An optical record disk for recording with a low-power recording laser beam and for playback with a related playback laser beam, both beams operating at a given wavelength, said record disk comprising, in combination:
    a substrate disk having a light reflective surface, said surface exhibiting high reflectivity at said wavelength;
    a thickness of insulator material exhibiting high transparency to said wavelength and overlying said substrate reflective surface;
    a non-continuous information deposit of "agglomerate material" exhibiting certain reflectivity, absorption and transmissivity at this wavelength, while being selected, deposited and arranged so as to agglomerate, and so alter reflectivity when exposed to said recording beam, yet without being ablated or otherwise expelled thereby.

9. A record for non-deformational, non-ablating recording of "transition bits" on an information deposit thereon with low-power laser write-beams of prescribed wavelength, the record comprising:
    a substrate disk including a prescribed reflector surface exhibiting high reflectivity at said wavelength;
    a spacer layer overlying said surface;
    a semi-continuous deposit of agglomerate material" on the spacer layer and comprising said information deposit; this agglomerate material being formulated and applied as a minimum mass whereby, in combination with said spacer layer and reflector surface, the agglomerate material exhibits a first "agglomerated" reflectivity at the "transition-bit" sites which have been subjected to the write-beam and exhibits a second, significantly contrasting reflectivity elsewhere; yet without ablating or being otherwise expelled under said write beam.

10. A novel optical digital record means for use with a radiant energy recording system employing a recording laser providing a write beam of a given frequency and relatively low power, the record means comprising the combination of:
    a substrate;
    a layer of reflector material exhibiting high reflectivity at said given frequency, said layer overlying a surface of said substrate;
    a dielectric thickness on the reflector material, this thickness equal to an integer multiple of the quarter-wavelength of the laser light output passing therethrough and exhibiting relative transparency to the beam at said given frequency, and a non-continuous, minimal mass deposit of agglomerate material on the dielectric, this deposit exhibiting significant reflection and greater transmission absorption at said given frequency, while being adapted to "agglomerate" under said beam;

wherein the antireflectivity of said dielectric thickness minimizes reflective energy loss and its reflectivity minimizes energy loss into said substrate, this dielectric thickness causing light reflected by said reflector to be out of phase with light reflected at the surface of the deposit thereby effecting an enhancement of the write-sensitivity of the record means;

said agglomerate material being selected and deposited so as to agglomerate and shift in reflectivity when subjected to the recording beam, yet without being ablated or grossly expelled by it.

11. An optical record means for non-deformational, non-ablative recording of "transition bits" on an information region thereof, with low-energy laser write beams of prescribed wavelength, this record means comprising:

a substrate including a prescribed reflector surface exhibiting high reflectivity at said wavelength; a spacer layer overlying said surface; and a thin, discontinuous minimum-mass deposit of gold overlying this spacer layer and comprising said information layer, the deposit-gold being formulated and applied in sufficiently discontinuous fashion whereby, in combination with said spacer layer and reflector surface, the deposit-gold will exhibit an "agglomeration" change in morphology-reflectance when subjected to said write beam, this being characterized by an associated first written-reflectivity, with the layer exhibiting a second, significantly-contrasting, virgin-reflectivity elsewhere.

12. An archival optical information record means comprising a disk substrate with record means thereon, this record means comprising a deposit of agglomerate material adapted to "agglomerate" with associated reflectance-alteration, without ablation or gross translation or deformation, whenever subjected to a prescribed recording radiation beam.

13. The record means of claim 12 where the agglomerate material comprises at least one noble metal.

14. The record means of claim 13 as adapted for use with a low-power recording laser beam for playback with a related playback laser beam, both beams operating at a given wavelength, the record means comprising, in combination:

a substrate disk having a light reflective surface, said surface exhibiting high reflectivity at said wavelength;

on this reflective surface a thickness of clear organic spacer-insulator material exhibiting high transparency to said wavelength;

on this insulator a record deposit of said "agglomerate material" of minimal thickness and exhibiting certain reflectivity absorption but greater transmissivity at this wavelength, while being selected, deposited and arranged to be written-upon so its reflectivity is significantly altered by said recording beam, yet without being ablated or otherwise expelled or grossly translated or deformed thereby; and a flexible organic overcoat superposed on the record deposit layer and adapted to accommodate said writing; this overcoat being covered, in turn, by a relatively hard, rigid wear-cap thickness.

15. The combination as recited in claim 14 wherein:

the substrate disk has at least one metallic reflector film means thereon constituting a reflector surface;

on this reflector surface is a spacer layer comprising a thermally-insulative transparent dielectric polymer whose depth, in conjunction with the reflector film means, constitutes an "anti-reflective" substrate for said deposit while also serving to thermally isolate the deposit when so "agglomerated" by the recording beam.

16. The combination as recited in claim 15 wherein the spacer layer overcoat each comprise a fluoro-polymer deposit.

17. The combination as recited in claim 16 wherein a wear-cap thickness is superposed on said overcoat.

18. The record as recited in claim 17 wherein said organic overcoat is comprised, at least principally, of a transparent fluoro-polymer adapted to be transparent to the beam, and to adhere well to the wear-cap thickness; said beam write-energy being well below that required to raise said layer metal to its "bulk melting point".

19. An improved digital data recording system comprising:

record means including a prescribed non-continuous recording region of agglomerate material adapted for recording of "bits" thereon by exposure of the bit site to a prescribed radiation beam of prescribed wavelength and energy such as to "coagulate" and significantly alter reflectance, yet without ablating the material, such that those "bits" may readily be read-out by related playback radiation means and yield adequate signal contrast; and recording means including a radiation source means adapted to present this recording beam to so write the "bits" as such reflectance transitions;

scan means adapted to translate said record means relative to said recording means along prescribed recording paths.

20. The combination as recited in claim 19 wherein the source means comprises a low-power laser, the record means being so arranged and adapted as to accommodate such read-out with the same, or a related, laser, though at reduced intensity.

21. The combination as recited in claim 19 wherein the agglomerate material comprises only gold in non-continuous masses, no more than about one hundred to several hundred Å thick.

22. The combination as recited in claim 19 wherein the agglomerate material comprises one or more noble metals.

23. The combination as recited in claim 19 where the recording source means comprises a low power laser means, on the order of 1-10 mW, and is controlled to expose each bit site for a few nanoseconds.

24. The combination as recited in claim 23 where the record means is provided as part of a disk drive computer terminal with the transition material provided on anti-reflective portion of a metal disk surface.

25. The combination as recited in claim 24 where the agglomerate material comprises a thin discontinuous film vapor-deposited on a dielectric spacer means supported on a reflective film, these forming, together, an "optical tri-layer" structure.

26. An improved archival digital data recording system comprising:
   disk record means including a non-continuous deposit of low-mass, non-ablative archival record material adapted for recording of "bits" thereon by a prescribed radiation beam of prescribed wavelength serving to "coagulate" and significantly alter deposit-reflectance, such that those "bits" may readily be read-out by related radiational playback means and yield adequate signal contrast;
   recording means including a radiation source means adapted to present such a recording beam to so "write" the "bits" as such "reflectance changes", the intensity of this beam being kept to a minimum; and
   scan means adapted to translate said record means relative to said recording means along prescribed recording paths.

27. An improved method of recording digital data on archival computer records, the method comprising:
   providing disk record means by depositing a minimum mass of non-continuous archival record material on a disk substrate, this material being selected and adapted for recording of "bits" thereon by a prescribed radiation beam of prescribed intensity and wavelength such as will "agglomerate" this record material, and so significantly alter layer-reflectance, yet without ablating the material, or expelling it, whereby these "bits" may readily be read-out by related radiational playback means and yield adequate signal contrast;
   providing recording means including a radiation source means adapted to present such a recording beam to so write the "bits" as such "agglomerated reflectance changes", and operating this beam so its intensity is at or about the level at which said material "agglomerates"; and translating said record means relative to said recording beam along a prescribed recording path, while modulating the intensity of the beam and causing its intensity to rise to recording-level in accordance with information to be recorded.

28. The method of claim 27, wherein the source means comprises a low-power laser, the record means is so arranged and adapted to accommodate such read-out with the same, or a related, laser, at reduced intensity; and wherein said record material is comprised of a minimum mass of noble metal.

29. The method of claim 28, wherein the record material comprises up to a few hundred Å of gold.

30. The method of claim 29 wherein the recording means includes anti-reflective support means for the record material.

31. The improved digital data recording method of claim 27, wherein the record means is arranged to include a disk substrate having a reflector surface highly reflective of said recording beam, a dielectric relatively highly thermal-insulative spacer thickness overlying the reflector surface and highly transparent to said beams and serving as the substrate for said record material which is adapted to be "agglomerated" and thus reflectance-switched by said recording beam, and wherein said beam is arranged to be generated by a low-power recording laser of prescribed frequency and which is intensity-modulated in accordance with the data signals to be recorded, being focused on the information layer as the record means is moved relative to the beam, the write-intensity thereof being adapted only to cause said "agglomeration" and not to ablate or other wise grossly deform or translate the record material.

32. An optical recording method for use with a record means having a major surface coated with a multiplicity of layers including a minimum mass of agglomerating archival metal deposited to be non-continuous, a subjacent spacer thickness overlying a metallic mirror layer of high reflectivity under recording radiation, the recorded bits being adapted for detection with prescribed read-out means, this method comprising the steps of:
   focusing a light beam upon this metal deposit; and
   moving a succession of bit-regions of the metal deposit recording surface relative to the path of said focused light beam; while causing the intensity of said focused light beam to alternate between a first high recording level and a second lower read-back level in accordance with information to be recorded; whereby to selectively write by inducing "agglomeration" of the metal, with associated change in reflectance at the bit regions.

33. A method of radiation recording to form digital data bits on a variable-reflectance record of archival quality and suitable for use with optical playback apparatus employing a playback radiation beam of a given light frequency, comprising the steps of:
   moving through the path of a recording radiation beam, a succession of regions of a record surface including a minimum mass of archival metal deposited in non-continuous fashion and adapted to "agglomerate" under said recording beam, the intensity of said recording beam being controlled to assume a first write-intensity level, just sufficient to cause said "agglomeration" and consequent "reflectance switching" of said metal in the recording-zone impinged by said recording beam, and a second, lower intensity level, yet without ablation of said metal deposit.

34. The method as recited in claim 33, wherein said metal deposit is supported on a spacer thickness which is transparent to the beam and which, in turn, is supported on reflector means; whereby the light of said beams is of a light frequency at which said metal deposit exhibits significant transmissivity and is of a phase so related to said given spacer thickness as to cause the recording-zone surface to exhibit substantially zero reflectance for the light of said beam impinging thereon except at the "agglomerations", where data bits are thus written.

* * * * *